United States Patent [19]

Thompson

[11] Patent Number: 4,555,292

[45] Date of Patent: Nov. 26, 1985

[54] METHOD OF FORMING A NON-SKID SURFACE WOOD PANEL

[75] Inventor: Thomas L. Thompson, Costa Mesa, Calif.

[73] Assignee: Thom-McI, Inc., Balboa, Calif.

[21] Appl. No.: 580,839

[22] Filed: Feb. 16, 1984

[51] Int. Cl.[4] .............................................. B32B 31/00
[52] U.S. Cl. ..................................... 156/279; 52/181;
52/811; 114/263; 156/258; 156/295; 156/315;
156/330; 238/14; 404/19; 427/202; 427/203;
427/205; 428/143; 428/212; 428/328
[58] Field of Search ............... 156/257, 295, 258, 315,
156/279, 330; 114/263; 238/14; 404/19;
52/811, 181; 428/212, 328, 143; 427/202, 205,
203

[56] References Cited

U.S. PATENT DOCUMENTS 2,009,595 7/1935 Van Der Pyl ........................ 52/181
2,300,728 11/1942 Goss ..................................... 156/258
3,334,555 8/1967 Nagin et al. ......................... 427/202

FOREIGN PATENT DOCUMENTS 50-8479 4/1975 Japan ................................... 156/279
1560692 2/1980 United Kingdom ................. 52/181

Primary Examiner—John J. Gallagher
Attorney, Agent, or Firm—Francis X. LoJacono

[57] ABSTRACT

The present invention defines two methods of forming a non-skid-surfaced wood panel, preferably plywood, which is treated with various coats or layers of epoxy resin, together with a finished surface coat of polyurethane combined with a hard-grit abrasive material evenly spread within the surface coat, so as to provide the non-skid substance that establishes a unique and wear-resistant structure for areas subjected to heavy foot traffic, the invention being particularly suitable for use on decking in marine environments.

1 Claim, 5 Drawing Figures

METHOD OF FORMING A NON-SKID SURFACE WOOD PANEL

BACKGROUND OF THE INVENTION

1. Field of the Invention

This invention relates to a structural panel, and more particularly to a panel constructed preferably from a section of plywood that is processed so as to establish a unique method of forming a non-skid-surfaced wood panel, wherein the finished product provides a weatherproof and wear-resistant structure for areas subjected to heavy foot traffic, such as marine decking.

2. Description of the Prior Art

The invention as disclosed herein is particulary suitable for solving various and difficult problems associated with surface structures which are designed for heavy pedestrian traffic, especially with respect to those surfaces associated with marine-dock systems and their surrounding structures. Several types of walking surfaces have been employed for this purpose, but with limited success. At present, there are two widely used surface materials, one being made from wood products and the other being constructed from relatively thin concrete or cement slabs. Wood surfaces are generally formed from a multiplicity of juxtaposed plank members positioned transversely across the deck or walkway.

A dock structure or walkway formed from cement slabs is usually defined by elongated rectangular slab members having a thickness of from one to two inches. Even though cement surfaces are becoming more popular over wood surfaces in the construction of marinas and related floating-dock structures, there are two inherent problems that prevail. One of these is that concrete slabs are very heavy and add considerable weight to an already large and heavy structure, making them cumbersome and difficult to handle; and the other is that cement slabs used for dock fingers and walkways are not resilient, and have a tendency to crack when subjected to twisting and flexing in turbulent water caused by adverse weather conditions.

Hence, it can be readily understood from the following disclosure of the present invention that, when the end product thereof is employed, the above-mentioned problems are overcome.

SUMMARY AND OBJECTS OF THE INVENTION

The present invention has for an important object to provide a new and unique method of forming a non-skid-surfaced wood panel that can be readily employed as a structural walkway or decking for marinas and like areas.

Another object of the present invention is to provide a method of forming a non-skid-surfaced wood structure that is lightweight and wear-resistant, and capable of allowing heavy pedestrian traffic, while eliminating the above-mentioned problems that are inherent in the known surface structures.

Still another object of the invention is to provide a non-skid, preferably plywood, panel structure that is lightweight, durable and resilient, so that it can flex without cracking.

Another object of the invention is to provide a non-skid-surfaced plywood structure wherein the plywood is sealed on both opposing surfaces by applying a low-viscosity coat of catalyzed epoxy resin which is allowed to soak into the wood fibers. Immediately following the first application, a second coat of thickened epoxy resin of approximately 20 to 30 mils is applied. This coat is allowed to dry for approximately one hour, whereupon a third coat of pigmented polyurethane is then applied to the epoxy surface, so as to attain a thickness of approximately 30 mils. While this third coat is still quite wet, and before it develops a skin, a very hard grit material such as aluminum oxide is evenly broadcast over the wet surface. The grit is provided with the proper coarseness so as to establish a sandpaper-like surface.

A still further object of the invention is to provide a method of this character that can be used for forming a non-skid surface structure that can be readily employed either as a permanent or a temporary walkway for pedestrian traffic at building sites, and for replacement and/or repair of worn walkways or decks that would otherwise need to be reconstructed.

Other features, objects and advantages of the instant invention will be obvious to persons skilled in the art from the following detailed description of two embodiments, accompanied by the attached drawings, in which identical reference numerals will refer to like parts in the various views.

BRIEF DESCRIPTION OF THE DRAWINGS

Referring more particularly to the accompanying drawings, which are for illustrative purposes only.

DESCRIPTION OF THE PREFERRED EMBODIMENT

Referring more particularly to FIGS. 1 through 4, there are shown enlarged cross-sectional views representing a non-skid surfaced panel 10 illustrated in such a manner as to indicated sequentially the several necessary steps for producing the panel.

As previously mentioned heretofore, there are several areas of application for which the present invention is well suited, even though its main purpose is to establish a non-skid decking in and about waterfront areas or related environments, and more particularly in connection with decking for marine-dock structures. However, it is readily apparent that, after understanding the end results of the present invention and its unique advantages, other uses for floorings, walkways and even roadways, can be established.

Figure 1:
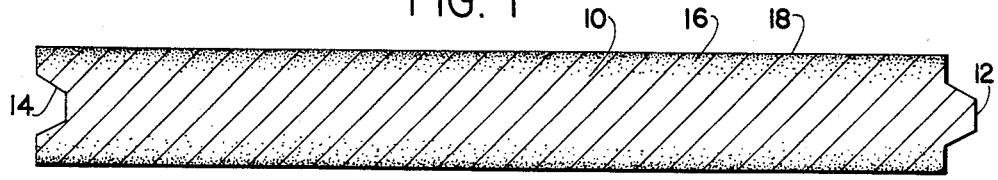
FIG. 1 is a cross-sectional view of a piece of plywood, indicating the first step of applying a thin viscous coat of sealer material.
Figure 2:
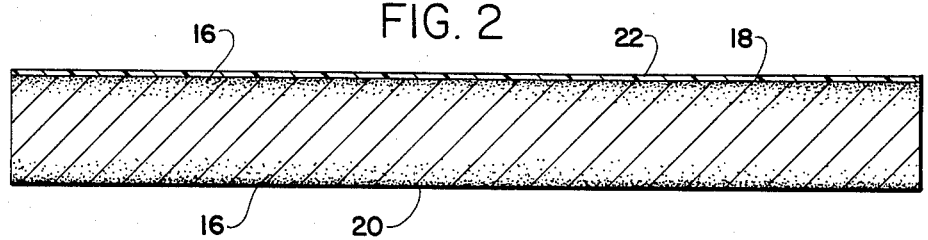
FIG. 2 is a cross-sectional view of the wood pieces, illustrating the second step of applying a thickened coat of an epoxy material.
Figure 3:
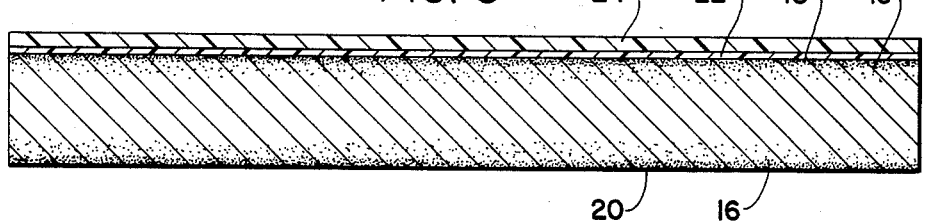
FIG. 3 is still another similar cross-sectional view, showing a third step wherein a third thick coat is applied thereto.
Figure 4:
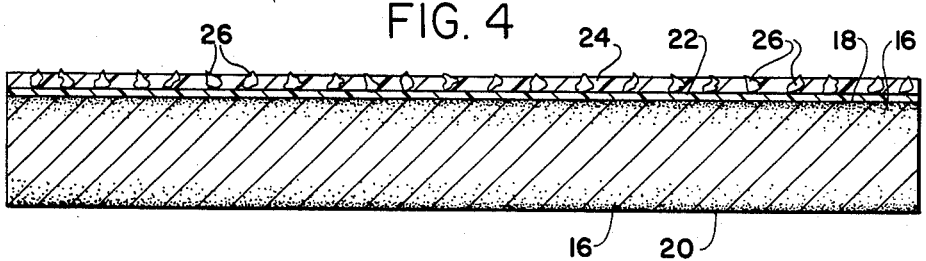
FIG. 4 is another cross-sectional view, illustrating the last step of applying a grit material to the surface thereof.

FIG. 1 shows a wood panel 10 which is formed preferably from a plywood structure having a thickness of between ¼" to 2½", with a specification requiring a 1⅛" thick Grade CC exterior plywood panel which is pressure-preservative treated.

It is important to note, however, that other wood products, such as planks, boards, etc., can be substituted for the plywood which is used in the description because it is considered to be the preferred embodiment of the present invention.

The purpose of the particular method of forming the end product of the non-skid-surfaced panel is to provide a permanent but flexible bonding between the plywood and the non-skid elements thereof. Accordingly, the present invention defines a plywood panel of a generally rectangular configuration including flat opposite surfaces having the approximate dimensions of a typical 4'×8' panel. It is contemplated that each panel will include a tongue-and-groove arrangement. That is, a tongue 12 is formed along one longitudinal edge of panel 10, and a matching groove 14 is formed along the oppositely disposed longitudinal edges. This establishes a contiguous sealed connection between adjacent panels when they are structurally placed.

Once the plywood panel is selected and defined, a coat of catalyzed eopxy resin 16 having a low viscosity is applied to both flat surfaces 18 and 20 of panel 10. In other words, a catalyzed epoxy resin, indicated by the dots 16, must be applied in a thin liquid state, so as to penetrate within the surfaces 18 and 20, thus soaking into the wood fibers and readily sealing these respective surfaces.

The next step is to immediately apply a second coat of the same type of catalyzed epoxy resin. However, this second coat 22 is much thicker in viscosity and is formed having a thickness of between 10 to 30 mils. In order to aid in the bonding strength of epoxy layer 22, there is added thereto a sufficient amount of ground fiberglass (cabosil) which moreover provides a controlled viscosity of the epoxy resin. The second coat 22 is applied only to surface 18, which defines the upper or outer surface, and is then allowed to harden together with the first thin coat 16. Thus, a very strong bond is established between the second thick coat 22 and the saturated wood fibers on surface 18. The time required for the hardening of the second coat 22 can vary, but generally it takes about one hour to dry hard under normal, ambient, room temperature, although the plywood at this time can, if desired, be subjected to a predetermined controlled temperature, whereby the hardening time will be set under a selective temperature-controlled environment.

After the hardening of second coat 22, a third coat 24 is applied. This coat is preferably a pigmented polyurethane material that is spread or rolled over coat 22 and is applied having a thickness of between 10 to 40 mils, but preferably 30 mils. The thickness of this coat is normally determined by the size and type of abrasive material that is combined therewith, the grit size being between No. 30 and No. 60. That is, while the polyurethane coat 24 is still very wet, and before it develops a skin-like surface, an overlay of very hard grit substance 26 is evenly spread or disseminated over the wet layer of polyurethane. It is preferred that grit 26 be a No. 46 size of aluminum oxide, whereby a 30-mil thickness to layer 24 would be achieved so as to allow the very sharp edges of the aluminum-oxide, sand-like particles to extend slightly above the surface of coat 24. Thus, the greater part of each grit particle is submerged and held in place by the proper thickness of the polyurethane material. It should be noted that other grit materials can also be used as an overlay under specific environmental conditions. Various materials such as silica sand and crushed walnut shells can be employed to provide a non-skid-coating base.

Figure 5:
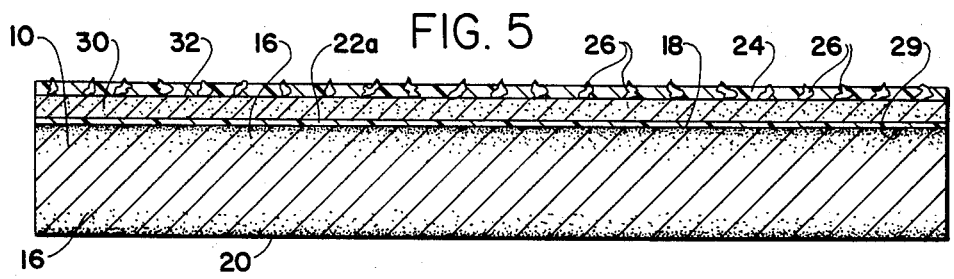
FIG. 5 is a cross-sectional view, illustrating an additional embodiment of the invention which uses a sheet of fiber/cement therewith.

A second embodiment is disclosed in FIG. 5, wherein a fiber/cement panel 30 having the same rectangular configuration as that of plywood panel 10 is placed over the second epoxy layer 22, thereby bonding the fiber/cement panel to the plywood panel. The fiber/cement panel 30 is relatively thin and has a thickness of approximately ⅛". This panel generally consists of 36 percent Portland cement; 30 percent crushed limestone; 20 percent Possolan Volcanic ash; and 14 percent cricotile asbestos fiber (silky) ⅜" long. This particular composition is highly resistant to salt corrosion, has excellent chemical resistance, and has resilient qualities to prevent cracking when subjected to constant movement, particularly when used as a walk surface on a floating-dock structure supported in a body of water, in which case the panels bend and twist to some extent.

Accordingly, the following additional steps are required when the fiber/cement panel is employed:

After applying the second coat of thicker cabosil-epoxy resin 22 to the plywood surface 16, this same thicker resin is also applied to the underside 29 of the fiber/cement panel 30. While both fiberglass-epoxy resin coats are still wet, the fiber/cement panel 30 is positioned over the plywood panel, allowing the two epoxies to commingle as one coating 22a.

At this time, the two attached panels 10 and 30 are placed in a press, whereby approximately 100 p.s.i. pressure is applied, thus forcing out the excess epoxy material and establishing a very thin bonding line between the two panels.

Once this is accomplished, the pigmented polyurethane-material coat is applied to the upper surface 32 of panel 30. Again, the thickness of the coat is determined by the size and type of abrasive material that is applied thereafter.

After panel 30 is bonded to plywood panel 10, polyurethane layer 24 is applied, as described above, together with the appropriate grit material 26.

It should be noted, however, that on some occasions the grit (aluminum oxide) will prove to be too abrasive for use as intended, in which case it will then be necessary to apply a second coat of polyurethane so as to reduce the sharpness of the abrasive particles. The second coat will further cover the grit surfaces to the level where only the top points of the grit are protruding from the surface, or the points might be slightly covered in the case of lower-lying grit particles. As foot-traffic wear takes place, some of these lower particles of grit will wear through the top-cover coat and provide part of the non-skid effect. Furthermore, the second coat will also trap any loose grit that, for some reason, might not be well fastened into the first coat. A second benefit is derived from employing a second finished polyurethane coat—which is that the color of the surface can be precisely controlled.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A method of forming a non-skid-surfaced plywood panel having a permanent but flexible bond between said plywood and the elements thereof, wherein the method comprises the steps of:

provinding a sheet of plywood having substantially flat opposite surfaces;

applying to each of said surfaces a first coat of low-viscosity, catalized, epoxy resin so as to penetrate and seal said surfaces;

applying a second coat of a catalyzed epoxy resin to the upper surface of said plywood panel prior to the drying of said first coat of epoxy resin, said second coat having a higher viscosity than said first coat;

providing a fiber/cement panel having substantially the same configuration as said plywood panel;

applying a third coat consisting of the same catalyzed epoxy resin used in said second coat to one surface of said fiber/cement panel;

placing said coated surfaces of each panel into opposing engagement with each other;

applying pressure to said panels, whereby excess epoxy material is forced from between said panels;

allowing said epoxy between said panels to dry;

applying at a predetermined thickness a fourth coat of pigmented polyurethane material to form a surface layer over the exposed surface of said fiber/cement panel;

disseminating a hard grit material over said fourth coat while said polyurethane material is still in a wet stage, said grit material being of a size greater than the thickness of said fourth coat, so as to allow a portion of said grit to be exposed above the surface of said fourth coat; and allowing said polyurethane coat to dry, thereby securing said grit material within said fourth coat.

* * * * *